United States Patent [19]

McGinnis

[11] 4,125,496

[45] Nov. 14, 1978

[54] FRICTION MATERIAL

[75] Inventor: Stephen B. McGinnis, Beacon Falls, Conn.

[73] Assignee: Raybestos-Manhattan, Inc., Trumbull, Conn.

[21] Appl. No.: 763,546

[22] Filed: Jan. 28, 1977

[51] Int. Cl.² .......................... C08K 3/08; C08L 1/00
[52] U.S. Cl. ........................ 260/17.4 BB; 260/42.17; 260/42.22; 260/42.25; 260/42.32; 260/998.13; 260/DIG. 39
[58] Field of Search ....... 260/42.32, 998.13, DIG. 39, 260/17.4 BB, 42.17, 42.22

[56] References Cited

U.S. PATENT DOCUMENTS

| | | | |
|---|---|---|---|
| 3,055,952 | 9/1962 | Goldberg | 260/94.7 |
| 3,227,249 | 1/1966 | Kuzmick et al. | 260/998.13 |
| 3,274,147 | 9/1966 | Zelin, Sr. et al. | 260/42.32 |
| 3,390,113 | 6/1968 | DeGaugue | 260/998.13 |

*Primary Examiner*—James H. Derrington
*Attorney, Agent, or Firm*—Howson and Howson

[57] ABSTRACT

A friction material particularly useful in forming brake linings and disc brake pads capable of withstanding high temperatures without evidencing high wear and fade characteristics comprising an intimate mixture of inorganic fibers, particularly asbestos fibers, a liquid thermosetting hydroxyl terminated butadiene copolymer, and a peroxide catalyst for promoting curing of the copolymer.

8 Claims, No Drawings

FRICTION MATERIAL

BACKGROUND OF THE INVENTION

For many years friction materials used in friction elements, such as disc brake pads, brake linings, clutch facings and the like for motor vehicles, have comprised mixtures of inorganic fibers, especially asbestos fibers, and particulate material which is largely inorganic, bonded together by an organic binder, particularly a phenolic resin. In some instances, organic fibers, such as cotton, and metallic strands, such as copper wire, have been included to impart certain desirable physical properties to the friction elements. Unfortunately, processes used in making friction elements from certain of such compositions involve undesirable manipulative steps which add unduely to production costs. Also, some of the compositions, prior to being formed into the finished friction elements, present hazards to health and to the environment.

More particularly, fabrication of disc brake pads and the like from friction compositions having a phenolic binder which has been rendered fluid by addition of an organic solvent requires the use of certain undesirable processing steps. The initial mixture of inorganic fibers, filler and phenolic binder has such fluidity as to evidence substantial flow unless confined in a container. Accordingly, an initial hot molding step involving the use of both heat and pressure, by means of which the mix is fabricated into uncured parts, e.g. disc brake pads, having sufficient rigidity to be stored prior to final cure, is required. Such initial hot molding step consumes energy in the form of heat and makes for longer than desirable production times represented by dwell time in the mold. The latter problem can only be overcome by purchase and installation of additional expensive processing equipment. In addition, the organic solvent must be recovered by a system which minimizes the possibility of physical harm to workers and atmospheric polution.

Although there are dry mixes from which friction elements may be fabricated by a simple cold molding operation followed by heating of the "green" preforms to cure the binder, such dry mixes, which usually contain relatively short asbestos fibers as well as fines, are dusty and thus are hazardous to the health of employees exposed thereto.

It is an object of this invention to provide a friction material from which friction elements, such as disc brake pads, clutch facings, and the like, having acceptable high temperature properties, can be fabricated.

It is another object of this invention to provide friction products which when subjected to high temperatures in use do not evidence high wear and fade characteristics.

Still another object of this invention is the provision of a novel friction material of low fluidity which can be formed into friction products by means of a simple cold-molding operation, followed by curing at elevated temperatures in a free standing condition.

Yet another object of this invention is to provide a novel friction material which in processing to obtain friction elements does not present the health and environment polution hazards evidenced by certain prior known friction materials containing phenolic binders.

These and other objects of this invention will become further evident from the following detailed description of preferred embodiments and the appended claims.

DETAILED DESCRIPTION OF THE INVENTION

This invention is directed to a novel friction material particularly useful in forming friction elements, such as disc brake pads and clutch facings for motor vehicles and industrial applications comprising an intimate mixture of inorganic fibers, particularly asbestos fibers, an organic binder comprising a liquid thermosetting hydroxyl terminated butadiene copolymer, and a small amount of a peroxide catalyst effective to promote curing of the copolymer binder.

It was discovered that the friction material of this invention having the proportions of constituents as described more fully hereinafter, and in which the binder comprises a liquid thermosetting hydroxyl terminated butadiene copolymer, has a number of distinct advantages over similar friction materials having a phenolic binder, particularly in terms of processability.

Advantageously, the friction material in the form of the initial raw mix or blend has very little tendency to flow. Rather, it has a putty-like consistency which can be readily fabricated into form-maintaining friction parts, e.g. disc brake pads, by a simple and rapid cold molding operation, i.e. molding by application of pressure in the absence of applied heat. Thus, the novel friction material of this invention obviates the use of a hot molding operation with its inherent dwell time, whereby production rates can be increased many fold as compared to those systems wherein an organic binder, generally of the phenolic type dissolved in an organic solvent is used. Also, solvent recovery is avoided. The liquid binder of the thus-fabricated "green" friction elements of this invention can then be cured simply by heating the elements or parts to somewhat elevated temperatures in a free-standing state. Advantageously, the raw mix of this invention, because of its putty-like consistency, does not present the hazard to health posed by prior known dusty dry mixes containing phenolic resin binder.

The friction material of this invention provides advantages in simplified processing techniques, and also in the nature of friction elements having adequate physical properties, particularly as regards resistance to excessive wear and fade at high temperatures.

It is believed that the advantages of this invention are attributable primarily to the particular binder system employed, namely the use of a liquid thermosetting hydroxyl terminated butadiene copolymer having the emperical formula:

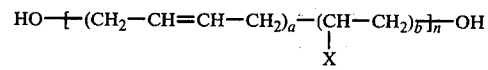

wherein X is phenyl or CN, $a$ has a value of from 0.5 to 0.95, $b$ has a value of from 0.05 to 0.5, and $n$ is an integer from about 10 to about 140.

Where X is phenyl in the above formula, i.e. where the copolymer is a butadiene styrene copolymer, preferably $a$ has a value of about 0.6 to 0.8, $b$ has a value of about 0.2 to 0.4, and $n$ is an integer from about 40 to 80, 54 being particularly preferred.

As to copolymers of butadiene and acrylonitrite, X is CN, preferably $a$ has a value of from about 0.7 to 0.9, $b$ a value of about 0.1 to 0.2, and $n$ is an integer from about 75 to 90.

Copolymers of the foregoing types are liquids prior to curing, the viscosity thereof being in the range of about 50 to about 5000 poise at 30° C., preferably about 100 to 500 poise. The copolymers also have a molecular weight in the range of about 550 to about 100,600, preferably 1500 to 5000. By reason of the presence of terminal hydroxyl groups, the copolymers have a hydroxyl value of 0.20 to about 0.85 meq/gm., and a hydroxyl number of about 25 to about 75 mg. KOH/gm.

The formula and properties of two particularly preferred copolymers are set forth in Table I, below:

Table I

| Formula | Styrene Copolymer | Acrylonitrite Copolymer |
| --- | --- | --- |
| a | 0.75 | 0.85 |
| b | 0.25 | 0.15 |
| n | 54 | 78–87 |
| Properties | | |
| Viscosity, poise at 30° C. | 150 | 525 |
| Hydroxyl Value, meq/gm. | 0.65 | 0.60 |
| Hydroxyl Number mg. KOH/gm. | 36.5 | 33.7 |
| Approx. M.W. | 3400 | 4500 |

These liquid copolymers are thermosetting in that they are heat-cureable in the presence of various catalysts, particularly organic peroxides such as dicumyl peroxide, t-butyl peroxide, cumene hydroperoxide, diisopropyl benzene hydroperoxide, t-butyl hydroperoxide, benzoyl peroxide, lauroyl peroxide and the like. Dicumyl peroxide is a particularly preferred catalyst.

The amount of peroxide catalyst needed to effect a satisfactory cure of the resin copolymer is relatively small, being on the order about 0.1 to about 10 parts, by weight, based on weight of the copolymer.

The friction material of this invention contains those inorganic and, in some instances organic and metallic constituents, used heretofore in friction materials. Thus, the friction material contains inorganic fibrous material such as asbestos or glass fibers, and particulate inorganic materials including various minerals such as talc, etc. Optionally, the friction material may contain such additional materials as pulverized coke, carbon sand, organic fibers such as cotton fibers, and metallic particles, especially copper.

The inorganic fibers or fibrous filler used in the friction material of this invention may comprise from about 20 to 70%, and preferably about 30 to 60%, by weight of the total composition. The fibers may be asbestos fibers, glass fibers, rock wool, fibrous talc and mixtures thereof. Asbestos fibers are preferred, but the particular type of asbestos used is not critical. Among the types of asbestos that may be used are amosite, crocidolite, tremolite, chrysotile, and anthrophylite, with chrysotile being particularly preferred. In the case of disc brake pads, the asbestos fibers generally will be grades 4 to 7, grades 5 to 6 being preferred. Somewhat longer asbestos fibers than these grades preferably are used in clutch facings. Glass fibers ranging in length from about one eighth to one quarter inch in length and having a diameter of about 0.00013 to 0.00051 inches have also been found to be particularly suitable for use in the friction materials.

In a modified form of the invention some or all of the inorganic fibers may be replaced with metal fibers, such as steel wool.

Organic fibers, particularly cellulose fibers (wood) may be used in combination with the inorganic fibers.

In addition to fibers, the friction material may contain various particulate fillers, which may be either inorganic or organic in nature. Depending upon type, these fillers will provide friction elements fabricated of the friction material of this invention with various desired properties. For example, elastomers in particulate form may be added to impart improved impact resistance to the friction elements and reduce noise. Wear resistance characteristics may be improved by the addition of particulate polymerized cashew nut shell oil, phenolic resins and polyamides and polyimides. Polymerized cashew nut shell oil also acts as a friction stabilizer. Dry lubricants such as molybdenum di-sulfide, graphite, lead, zinc and the like may be included to effect smooth sliding friction and provide high temperature protection. Abrasive particles such as alundum, silica, calcium aluminate, carborundum and the like may also be included.

The non-fibrous fillers of the aforementioned types may comprise from 0 to 80%, by weight of the total friction material composition.

As noted above, the organic binder used in the friction material of this invention comprises a liquid thermosetting hydroxyl terminated butadiene copolymer of the above emperical formula. The copolymer binder should comprise from about 2 to about 60%, by weight, based on the total weight of the friction material. In these amounts, the copolymer binder, which is a liquid in the uncured state, provides the raw mix with the desired dry putty-like consistency, whereby the composition can be molded into form-maintaining friction elements, e.g. disc brake pads, by a simple cold molding operation. Preferred friction materials according to this invention contain from about 10 to about 25% copolymer binder. Of course, there is also present in the composition a small amount of a peroxide catalyst, preferably dicumyl peroxide.

If desired up to 50% of the copolymer may be replaced with a conventional thermosetting phenolic resin, such as a phenolformaldehyde resin.

Two particularly useful friction compositions according to this invention are set forth in Table II below:

Table II

| Composition Type A (non-metallic) | Weight Percent | |
| --- | --- | --- |
| Constituent | Broad | Preferred |
| Copolymer binder | 10–60 | 10–25 |
| Peroxide catalyst | 0.1–10 | 0.1–5 |
| Asbestos fibers (6D) | 20–70 | 30–60 |
| Cellulose fibers (wood) | 5–25 | 10–20 |
| Coke (−200 mesh) | 0–15 | 1–8 |
| Graphite (−40 mesh) | 0–10 | 1–7 |
| Pigment (−200 mesh carbon black) | 0–15 | 1–8 |
| Composition Type B (semi-metallic) | | |
| | Weight Percent | |
| Constituent | Broad | Preferred |
| Copolymer binder | 2–50 | 2–10 |
| Peroxide catalyst | 0.02–12.5 | 0.04–1 |
| Metal fibers or powder (steel wool)* | 15–75 | 55–75 |
| Graphite (−40mesh) | 5–50 | 15–30 |

*Preferably 2:1 to 3:1, powder to fibers

In preparing the raw mix, the various constituents are charged to any suitable mixer, such as a Littleford Mixer, a ribbon mixer or a double arm mixer, where they are thoroughly mixed to obtain a substantially homogeneous blend. Heat may be applied during the mixing operation to facilitate mixing; however, the temperature used should be below that at which curing of the binder may take place. Instead of adding the individual components separately to the mixer, it may be desirable to initially blend the dry constituents and then add the liquid copolymer with which the catalyst may already have been combined to effect intimate contact between the two.

Mixing time depends upon such factors as composition, batch size and mixer efficiency, but in any event must be sufficient to insure homogeneity of the mix, which with most types of commercially available mixers can be attained in about 45 minutes.

After a homogeneous blend is obtained, the mix is discharged from the mixer and allowed to cool if heat was applied during mixing. Advantageously, the mix at this stage has a dry putty-like consistency which makes for greatly simplified handling.

The raw friction material or mix can then be formed into friction elements, typical of which are disc brake pads and brake linings, by means of a rapid and simple cold molding operation. In this step pressures on the order of 2000 to about 5500 psi may be used. The resulting friction elements are sufficiently form-maintaining to be stacked in storage and cured in a free standing position.

Curing of the binder can be accomplished by heating the thus-formed friction elements at elevated temperatures on the order of about 350° to about 600° F. for a period of several hours. Preferably, the elements are gradually heated from ambient temperatures to a temperature of about 525° F. over a period of about 5 hours, at which temperature they are maintained for an additional 7 hours. However, various heating rates and times may be used and the skilled resin chemist will encounter no difficulty in selecting satisfactory resin curing conditions.

The resulting friction elements may then be processed in a fashion typical to the industry in terms of surface grinding, drilling and applying the elements to supporting steel structures for use in brake application. The friction material of this invention has found particular use in disc brake pads.

The following examples are illustrations of preferred embodiments of the invention.

EXAMPLE 1

The below-listed constituents in the quantities stated were introduced to a Littleford Mixer where they were mixed for 45 minutes to obtain a homogeneous blend:

| Constituent | Parts by Weight |
| --- | --- |
| Butadiene-Styrene Copolymer (Arco CS-15 resin)* | 19.4 |
| Dicumyl peroxide catalyst | 1.8 |
| Carbon sand (−70 mesh) | 3.7 |
| Cellulose fibers (−100 mesh) | 15.1 |
| Coke (−200 mesh) | 1.9 |
| Asbestos 6D Grade | 59.8 |
| Pigment (−325 mesh carbon black) | 0.5 |
| Graphite (−40 mesh) | 1.5 |

*Hydroxyl terminated butadiene-styrene copolymer, a = 0.75, b = 0.25, n = 54.

The resulting homogeneous mixture was removed from the mixer and formed into a number of disc brake pads using a mold pressure of 3000 psi.

The green pads were placed in a free standing position in an oven and heated from ambient temperature to 525° F. over a period of 5 hours, at which temperature they were maintained for an additional 7 hours.

The pads, after being removed from the oven and cooled, were subjected to standard finishing steps including surface grinding and drilling, following which they were attached to steel supports for installation in test vehicles and laboratory testing equipment.

EXAMPLE 2

Disc brake pads prepared as described in Example 1 were tested for temperature wear and performance using a bench dynamometer fitted with a Chevrolet Vega type brake having a wheel load of 1364 lbs. and a rolling radius of 0.959 feet. The inertia was 39.05s-ft.$^2$. A thermocouple was installed 0.040 inch below the surface of the outboard test pad, as close to the center of the pad as possible. The Test Schedule was as follows:

1. Burnish: 100 stops from 36 mph (529 RPM), decel. approx. 10–12 fpsps (4.5–5.35 seconds to stop); 250° F. pad temperature before each stop. Dwell after stop to be less than 20 seconds.
2. Disassemble, brush, mike pad and rotor.
3. Run 300 stops at each of the following initial temperatures from 41 mph (600RPM) at 9.9 fpsps decel. (6.1 sec. to stop). Measure pad and rotor after each temperature level. After Stop 1 and every 50 thereafter, record pad temperature and pressure.

The test results obtained are set forth in Table III, below:

Table III

| Temp. (° F.) | Increment of Wear | | Rotor |
| --- | --- | --- | --- |
| | Inboard Pad | Outboard Pad | |
| 250 | .002" | .003" | 0.0" |
| 250 | .006" | .007" | 0.0" |
| 325 | .012" | .019" | 0.0" |
| 400 | 0.060" | .094" | 0.0" |

A similar friction material; but having a phenolic resin binder was tested in like manner, and the results obtained are set forth in Table V, below:

Table V

| Temp (° F.) | Increment of Wear | | Rotor |
| --- | --- | --- | --- |
| | Inboard Pad | Outboard Pad | |
| 250 | .004" | .005" | 0.0" |
| 250 | .010" | .007" | 0.0" |
| 325 | .037" | .026" | 0.0" |
| 400 | .063" | .063" | 0.0" |

EXAMPLE 3

Disc brake pads prepared according to Example 1 were subjected to Test Procedure J661a of the Society of Automotive Engineers. Because the procedure is well known to those skilled in the art of friction materials and is quite lengthy, for the sake of brevity it is not repeated here. The final average wear on such brake pads when so tested was 0.010 inch as compared to 0.030 inch for a pad of similar composition having a phenolic resin binder.

EXAMPLE 4

Disc brake pads prepared according to Example 1 were subjected to "Brake System Road Test Code - Passenger Car and Light-Duty Truck -- SAE J843d" approved January 1963, and last revised May 1971. The results of these vehicle tests are set forth in Table IV below:

Table VI

| Stop No. | First Fade Series | | Second Fade Series | |
|---|---|---|---|---|
| | Brake Temp. (° F)* | Line Pressure(psi) | Brake Temp. (° F)* | Line Pressure(psi) |
| 1 | 110 | 600-530 | 140 | 620-580 |
| 2 | 160 | 540-480 | 170 | 560-480 |
| 3 | 250 | 450-550 | 270 | 430-460 |
| 4 | 320 | 560-540 | 340 | 460-400 |
| 5 | 370 | 550-660 | 410 | 430-440 |
| 6 | 410 | 570-820 | 460 | 380-560 |
| 7 | 460 | 550-660 | 470 | 420-560 |
| 8 | 480 | 520-770 | 510 | 420-560 |
| 9 | 510 | 480-560 | 410 | 440-640 |
| 10 | 530 | 490-610 | 340 | 440-680 |
| 11 | | | 350 | 440-720 |
| 12 | | | 680 | 430-720 |
| 13 | | | 700 | 460-660 |
| 14 | | | 440 | 420-500 |
| 15 | | | 440 | 430-460 |

*after stop

The test was repeated on disc brake pads of similar composition, but containing a phenolic resin binder. The results obtained are set forth in Table VII below:

Table VII

| Stop No. | First Fade Series | | Second Fade Series | |
|---|---|---|---|---|
| | Brake Temp. (° F)* | Line Pressure(psi) | Brake Temp. (° F)* | Line Pressure(psi) |
| 1 | 140 | 700-500 | 80 | 500-400 |
| 2 | 180 | 560-660 | 180 | 440-420 |
| 3 | 260 | 580-780 | 240 | 420-400 |
| 4 | 320 | 640-860 | 340 | 440-400 |
| 5 | 360 | 780-1100 | 400 | 400-380 |
| 6 | 400 | 810-1240 | 440 | 460-600 |
| 7 | 440 | 780-1200 | 480 | 460-500 |
| 8 | 480 | 620-1100 | 520 | 440-620 |
| 9 | 520 | 580-1000 | 540 | 440-700 |
| 10 | 560 | 500-600 | 580 | 460-840 |
| 11 | | | 620 | 480-800 |
| 12 | | | 640 | 480-** |
| 13 | | | | |
| 14 | | | | |
| 15 | | | | |

*after stop
**Lining failure, test aborted

In the data set forth in Tables VI and VII above, the increasing line pressure indicates decreasing lining coefficient of friction.

The friction material of this invention reached a maximum of 720 psi during the second fade series. The phenolic-based composition, however, reached 1240 psi and 840 psi line pressures respectively during the temperature fade portions of the test. Since these results were obtained from actual vehicle performance tests, it can be concluded that the friction material of this invention tends to maintain a more stable coefficient of friction at higher temperatures than the standard phenolic system.

What is claimed is:

1. A friction element particularly useful in motor vehicles comprising a mixture of:
   (a) from about 20 to about 70 percent asbestos fibers;
   (b) from about 5 to about 25 percent cellulose fibers;
   (c) up to about 15 percent coke particles;
   (d) up to about 10 percent graphite particles, and
   (e) up to about 15 percent carbon black, bonded together with from about 10 to about 60 percent of a thermosetting organic binder comprising a hydroxyl terminated butadiene copolymer of the formula

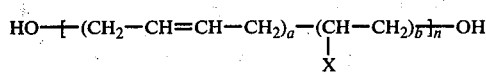

wherein X is phenyl or CN, $a$ has a value of from 0.5 to 0.95, $b$ has a value of from 0.05 to 0.5, and $n$ is an integer from about 10 to 140; said binder having been cured with from about 0.1 to about 5 percent of a peroxide catalyst; all of said percentages being by weight based on the total weight of said friction element.

2. A friction element according to claim 1 in which said inorganic fibers comprise asbestos fibers and said binder comprises a hydroxyl terminated copolymer of butadiene and styrene of the stated formula in which $a$ has a value of 0.75, $b$ a value of 0.25, and $n$ is an integer of from about 40 to 80, and said catalyst comprises dicumyl peroxide.

3. A friction element according to claim 1 in which said inorganic fibers comprise asbestos fibers, and said binder comprises a hydroxyl terminated copolymer of butadiene and acrylonitrile in which $a$ has a value of 0.85, $b$ a value of 0.15 and $n$ is an integer of from 78 to 87, and said catalyst comprises dicumyl peroxide.

4. A friction element according to claim 1 comprising:
   (a) from about 30 to about 60 percent asbestos fibers;
   (b) from about 10 to about 20 percent cellulose fibers;
   (c) from about 1 to about 8 percent coke particles;
   (d) from about 1 to about 7 percent graphite particles, and
   (e) from about 1 to about 8 percent carbon black bonded together with from about 10 to about 25 percent organic binder.

5. A semi-metallic friction element comprising a mixture of:
   (a) from about 15 to about 75 percent of a metallic material selected from the group consisting of metal fibers, metal powder and mixtures thereof, and
   (b) from about 5 to about 50 percent of graphite particles, bonded together with about 2 to about 50 percent, by weight of a thermosetting hydroxyl butadiene copolymer of the formula:

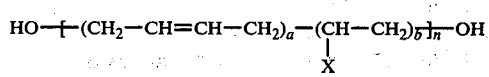

wherein X is phenyl or CN, $a$ has a value of from 0.5 to 0.95, $b$ has a value of from 0.05 to 0.5, and $n$ is an integer from about 10 to about 140; said copolymer having been cured with from about 0.02 to about 12.5 percent of a peroxide catalyst; all of said percentages being by weight based on the total weight of said friction material.

6. A semi-metallic friction element according to claim 5 comprising:
   (a) from about 55 to about 75 percent metallic material, and
   (b) from about 15 to 30 percent of graphite particles bonded together from about 2 to about 10 percent of peroxide cured copolymer.

7. A friction element according to claim 5 in which said binder comprises a liquid hydroxyl terminated copolymer of butadiene and styrene of the stated formula in which $a$ has a value of 0.75, $b$ a value of 0.25 and $n$ is an integer of from 40 to 80, and said catalyst comprises dicumyl peroxide.

8. A friction element according to claim 5 in which said binder comprises a liquid hydroxyl terminated copolymer of butadiene and acrylonitrile of the stated formula in which $a$ has a value of 0.85, $b$ a value of 0.15, $n$ is an integer from 78 to 87, and said catalyst comprises dicumyl peroxide.

* * * * *